United States Patent [19]

Havel

[11] 3,866,215

[45] Feb. 11, 1975

[54] ELECTRONIC KEYBOARD FOR TYPEWRITER

[76] Inventor: Karel Havel, P.O. Box 66, Station M, Toronto 21, Ontario, Canada

[22] Filed: Apr. 9, 1973

[21] Appl. No.: 348,937

[52] U.S. Cl. ............. 340/365 C, 178/17 C, 197/98, 235/145 R, 317/146 R, 318/602

[51] Int. Cl. ............................................ G08c 21/00

[58] Field of Search ............. 197/98, 18, 49, 53, 55, 197/6.6, 100; 101/93 C; 340/365 C, 3 101/258 C; 178/176, 81, 83; 317/146 35/5; 235/145 R; 318/6

[56] References Cited

UNITED STATES PATENTS

| | | | |
|---|---|---|---|
| 3,227,258 | 1/1966 | Pannier et al. | 197/6.6 |
| 3,230,357 | 1/1966 | Godlove et al. | 178/83 X |
| 3,254,313 | 5/1966 | Atkins et al. | 317/146 X |
| 3,269,510 | 8/1966 | Peters | 197/53 |
| 3,282,389 | 11/1966 | Rudisch et al. | 197/6.6 |
| 3,399,401 | 8/1968 | Ellis et al. | 340/365 C |
| 3,442,365 | 5/1969 | Ragland, III et al. | 197/18 X |
| 3,482,241 | 12/1969 | Johnson | 340/365 C X |
| 3,586,953 | 6/1971 | Markkanen | 318/685 |
| 3,588,875 | 6/1971 | Gabor | 340/365 C X |
| 3,589,494 | 6/1971 | Gloess | 197/98 X |
| 3,651,916 | 3/1972 | Becchi | 197/18 X |
| 3,677,386 | 7/1972 | Herterich | 197/18 |
| 3,679,036 | 7/1972 | Gloess | 197/98 X |
| 3,681,776 | 8/1972 | Gloess | 197/18 X |
| 3,691,555 | 9/1972 | Looschen | 340/365 C |
| 3,705,424 | 12/1972 | Harvey, Jr. | 197/98 |
| 3,757,322 | 9/1973 | Barkan | 340/365 C |
| 3,760,925 | 9/1973 | Bossi | 101/93 C |

OTHER PUBLICATIONS

IBM Tech. Discl. Bulletin, Vol. 6, No. 4, 9–63, Nick "Touch-Sensitive Circuits".

IBM Tech. Discl. Bulletin, Vol. 12, No. 8, 1–70, Taub "Capacitive Touch Key Circuit".

IBM Tech. Discl. Bulletin, Vol. 14, No. 11, 4–72, Hanson et al., "Capacitance Keyboard Encoding Circuitry" pgs. 3250–51.

IBM Tech. Discl. Bulletin, Vol. 5, No. 12, 5–63, Sharp "Non-Mechanical Keyboard," pp. 22.

*Primary Examiner*—Edgar S. Burr
*Assistant Examiner*—E. H. Eickholt

[57] ABSTRACT

An electronic keyboard, particularly suitable for a typewriter, comprising a matrix of keys arranged in at least one section and adapted for being manually contacted. Each key including a first and a second conductive areas, the first conductive areas of all keys in each section being integral, the second conductive areas of all keys of the matrix being separate and being electrically connected to a plurality of electrical contacts, respectively, of a rotary switch. Means is provided for all keys of the matrix for establishing a selected electrical state being changeable by manually contacting a key. A first at least one electronic sensing means is provided for detecting change of said electrical state in each section, a second electronic sensing means is provided for locating a key which is manually contacted. In a typewriter or like machine, a combination of an assembly comprising an electronic keyboard of this invention, a type wheel rotatably mounted on a carrier, a rotary switch, means for starting rotation of the wiper of the rotary switch and the type wheel in at least one direction into printing position aligned with a manually contacted key of the matrix, means for selectively stopping at least the type wheel in the printing position, means for selectively printing characters, and a platen.

6 Claims, 6 Drawing Figures

PATENTED FEB 11 1975 3,866,215

SHEET 1 OF 3

ELECTRONIC KEYBOARD FOR TYPEWRITER

BACKGROUND OF THE INVENTION

1. Field of the Invention

This invention relates to typewriters and more particularly to electronic keyboard for a typewriter having a plurality of manually contacted keys avoiding mechanical motion.

2. Description of the Prior Art

Presently used typewriters and like machines are normally provided with mechanically movable keyboards including a great number of movable parts. Such movable parts, however, introduce a significant weakness into the system and their susceptibility to wear substantially reduces performance and reliability of the typewriter.

Solid state circuitry has made it possible, at relatively low cost, to provide electronic keyboards avoiding movable parts. Such keyboards are easy to fabricate, reliable in use, and comfortable in operation. Peripheral elements for digital computers, such are alphanumeric inputs or printers, are known in the art, employing electronic keyboards with either movable or touch activated keys. However, typewriter employing an electronic touch activated keyboard is unknown.

Keyboard printer with continuously rotating character wheel, including a touch activated keyboard, is disclosed in U.S. Pat. No. 3,589,494, issued to Paul F. Gloess on June 29, 1971. Electronic keyboard, including a matrix of touch activated keys and electronic sensors for rows and columns of keys, is disclosed in U.S. Pat. No. 3,691,555, issued to Floyd W. Looschen on Sept. 12, 1972.

Accordingly, the principal object of the present invention resides in a provision of an improved electronic keyboard, particularly suitable for a typewriter, having a matrix of manually contacted keys avoiding mechanical motion.

It is another object of this invention to provide a keyboard for typewriter which is comfortable for typing.

It is still another object of this invention to provide a typewriter of very simple construction, including a small number of mechanically movable parts.

SUMMARY OF THE INVENTION

Electronic keyboard of this invention comprises a matrix of keys avoiding mechanical motion, adpated for being manually contacted. The keys include electrically conductive regions having a selected coupling capacitance, the capacitance being changeable by manually contacting a key. As little as two electronic sending means are required for the matrix, the first sensing means for detecting manual contacting of any key of the matrix, the second sensing means for locating the manually contacted key.

A typewriter or like machine employing an electronic keyboard of this invention, being of very simple mechanical construction, employs a type wheel rotatably mounted on a carrier and means for rotating the type wheel to a printing position aligned with a touched key of the keyboard. Disclosed are embodiments of a typewriter according to this invention with a type wheel rotatable in one direction or in two directions, and with type wheel rotating continuously.

BRIEF DESCRIPTION OF THE DRAWINGS

The invention is illustrated in the drawings in which.

Throughout the drawings, like numerals indicate like parts.

DESCRIPTION OF THE PREFERRED EMBODIMENTS

Figure 1:
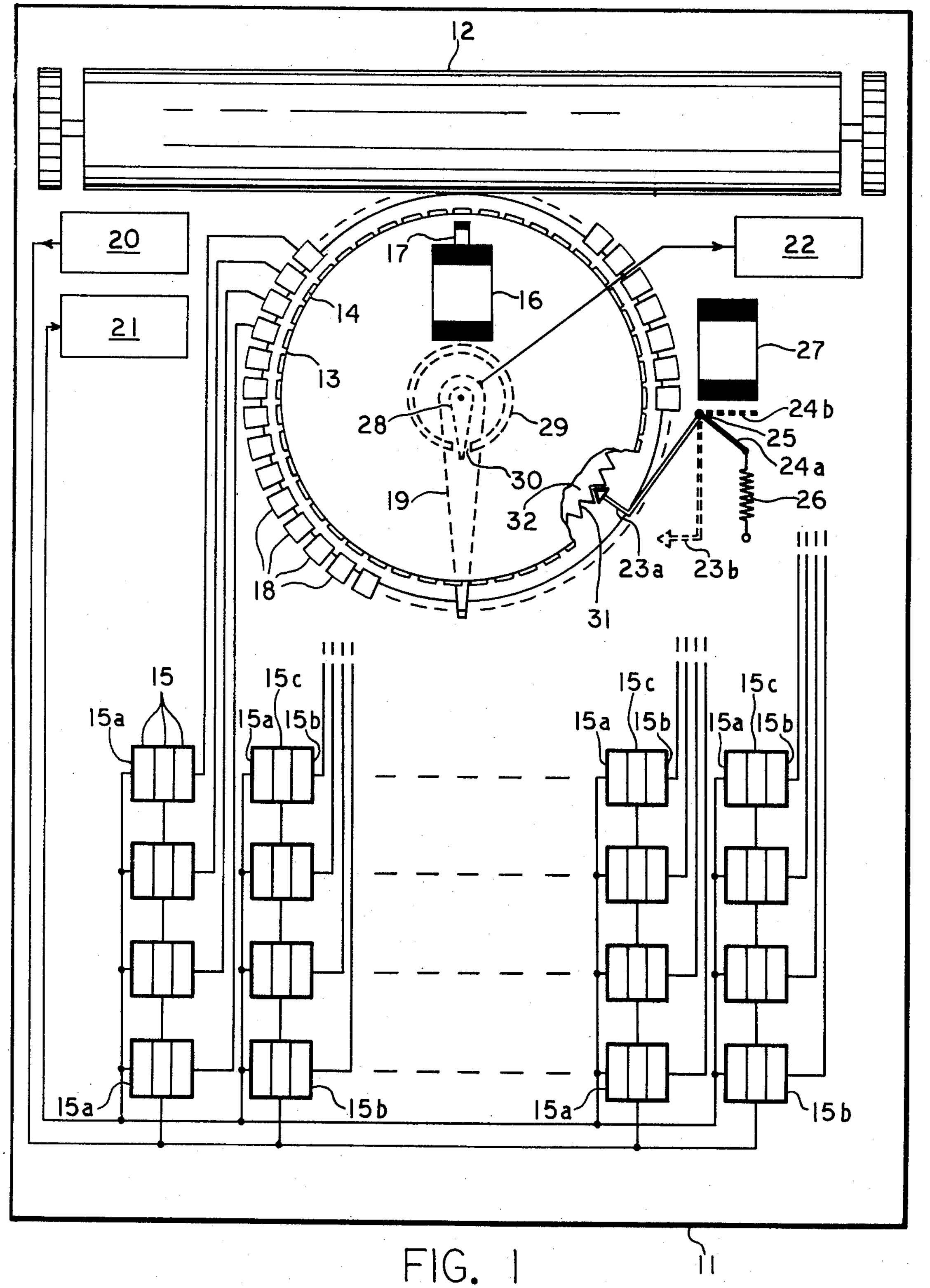
FIG. 1 is a plan view of a preferred embodiment of the typewriter with electronic touch activated keyboard of this invention, wherein type wheel is partially broken away to facilitate illustration.
Figure 2:
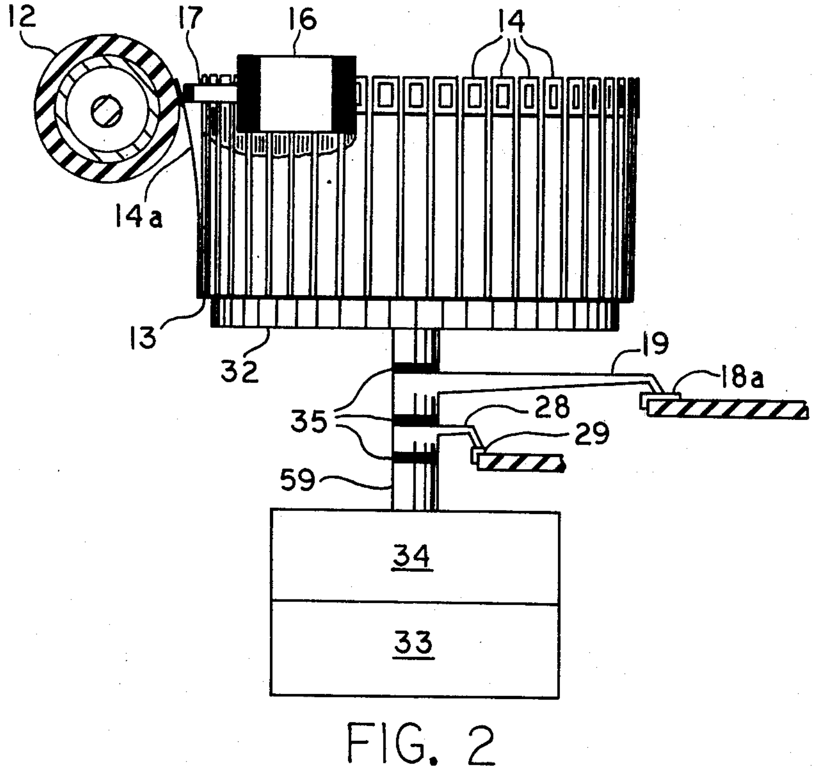
FIG. 2 is a side elevation of the type wheel and other rotating assembly of FIG. 1.

By referring to the drawings, a typewriter employing electronic keyboard of this invention is illustrated in FIG. 1 and FIG. 2. The typewriter includes a frame 11, which includes a type wheel 13, having a plurality of resilient type bars 14 extending axially thereof, rotatably mounted on a carrier (not shown), printing solenoid 16 having a striking hammer 17, rotary switch including a wiper 19 and a plurality of contacts 18 disposed along a circle in spaced positions, motor 33, clutch and brake 34, and a platen 12.

Electronic keyboard of the illustrated typewriter comprises a matrix of touch activated keys 15, adapted for being manually contacted. Each key of the matrix includes three electrically conductive areas adjacent a surface thereof. The first conductive areas **15*a* of all keys of the matrix are electrically interconnected and are electrically connected to the input of electronic sensing circuit 21. The second conductive areas 15*b* of all keys of the matrix are separate and are electrically connected to contacts 18, respectively, of the rotary switch. The third electrically conductive areas 15*c* of all keys of the matrix are electrically interconnected and are electrically connected to the output of high frequency generator 20. Wiper 19 of the rotary switch is electrically connected to the input of electronic sensing circuit 22**.

The electrically conductive areas of the keys are arranged to present a coupling capacitance, the capacitance being changeable by manually contacting a key. The keys typically exhibit small capacitance when not touched, and increased capacitance when touched by a human finger or like.

When no key of the matrix is manually contacted, the type wheel 13 and the wiper 19 are in home position as illustrated. A member 23, being pivotable in point 25, is urged by a coil spring 26 to occupy position **23*a*, being engaged in a triangular cavity 31 of a wheel 32**.

Driving mechanism for rotating type wheel 13 and wiper 19 from home position to a printing position includes an electrical motor 33, and clutch and brake 34, which may be selectively engaged or disengaged to cause the drive shaft 59 to rotate.

Upon touching any key of the matrix by a finger or like, the coupling capacitance of the conductive areas of the touched key increases, and increased high frequency current flows from the generator 20 via conductive area **15*c* of the touched key to conductive area 15*a*** of the same key to the input of electronic sensing circuit 21. The increase of the current is detected and the sensing circuit 21 produces suitable output electrical signal for actuating clutch and brake 34, to engage the latter with continuously rotating shaft of the motor 33 (not shown), to cause drive shaft 59 to rotate type wheel 13, wiper 19 and the other rotating assembly. The output electrical signal of sensing circuit 21 also actuates relay 27 to magnetically attract arm 24 of the member 23, thereby causing instantaneous pivotal motion of the latter in point 25, to occupy position 23*b*.

While rotating, wiper 19 electrically connects contacts 18, one at a time, to the input of electronic sensing circuit 22. When a contact, electrically connected to second conductive area 15*b* of a key not being touched by a finger, is momentarily connected to the input of sensing circuit 22, no change of capacitance is detected and the rotation continues. However, when a contact, electrically connected to second conductive area 15*b* of the key being touched by a finger, is connected to the input of sensing means 22, the change of capacitance caused by touching by a finger is detected. The sensing means 22 produces suitable output electrical signal for disengaging the clutch and brake 34, to stop rotating of type wheel, wiper and the other rotating assembly in a position wherein a character aligned with the touched key is in the printing position.

To compensate small errors in printing position of type wheel 13, the member 23 and the wheel 32, having a plurality of regularly spaced triangular cavities 32 along its perimeter, are provided. Each cavity 31 corresponds to one type bar 14. Relay 27 is deenergized by the output electrical signal of the sensing circuit 22. The arm 24, not being magnetically attracted any more, is pulled by spring 26, thereby uring the member 23 to occupy position 23*a*, to engage with a triangular cavity 31 in the nearest proximity, thereby shifting the wheel 32 together with the type wheel 13 into the precise printing position.

Solenoid 16 is also actuated by the output electrical signal of the sensing circuit 22, to strike by printing hammer 17 type bar 14*a* to deflex the latter to the contact with a ribbon (not shown) and with the platen 12, to create impression of the character.

Type wheel 13 together with wiper 19 and the other rotating assembly are thereafter rotated back to home position.

Figure 3:
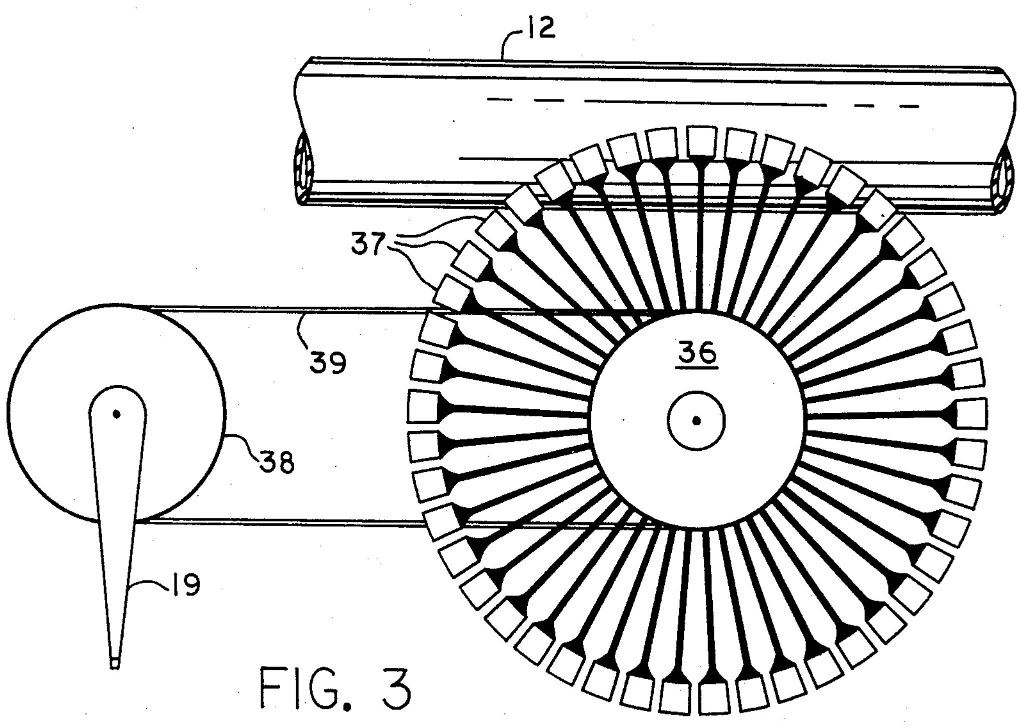
FIG. 3 is a front elevation of the petaled type wheel.

In FIG. 3 is illustrated a type wheel including a disc 36 having a plurality of flexible petals 37, carrying characters. The type wheel 36 is rotated into a printing positon by mechanism including a wheel 38 coupled to wiper 19, and a flexible strand 39. The petal in printing position is stricken by hammer of a printing solenoid (not shown) and flexes toward the platen to imprint the character.

It is readily apparent that the association between the wiper of the rotary switch and the type wheel is not restricted to a mechanical coupling. The wiper and the type wheel may also be mounted directly on shafts of two servomotors, respectively (not shown), the servomotors being electrically coupled. The type wheel may be thus rotated by its servomotor to a printing position aligned with the position of the wiper, either synchroniously or asynchroniously.

It is also readily apparent that the type wheel may be continuously rotated, rather than remain stationary in home position, and to print characters either after full stopping in a printing position, or without stopping. In the latter case the printing solenoid will be energized at the precise mement when the desired character reaches printing position, no starting pulse being required.

Figure 4:
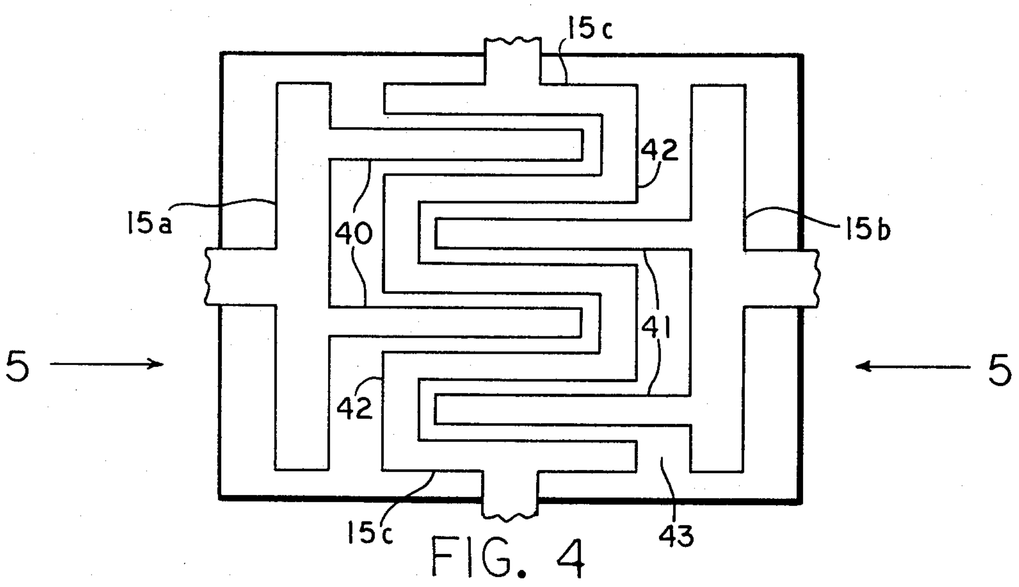
FIG. 4 is an enlarged detail of one key of an electronic keyboard of this invention.
Figure 5:
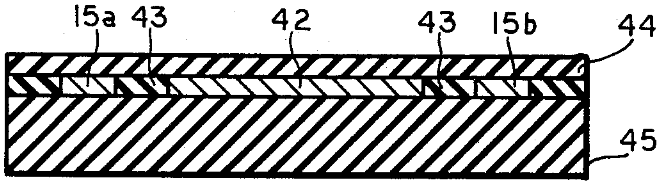
FIG. 5 is a sectional view taken along line 5 — 5 of the key of FIG. 4.

In FIG. 4 and FIG. 5 is shown enlarged detail of one key of the keyboard of this invention. The key may be formed from conductive layers on a printed circuit board, or on a base 45 from electrically insulating material. Conductive regions of the key are coated with a thin insulating sheet 44, which is removed from the key in FIG. 4 in order to facilitate illustration. The illustrated key includes conductive areas 15*a* and 15*b*, having branches 40 and 41, respectively, extending over the area of the key. Conductive area 15*c* is interposed in the form of sinuous region 42 between interleaved branches of conductive areas 15*a* and 15*b*, so as to increase capacitive coupling surfaces. Conductive areas of the key are electrically insulated from one another by electrically insulating areas 43.

Keys have a selected capacitance when not being touched by a finger, the capacitance being changeable by touching by a human finger or like. The changes of capacitance of a key caused by touching by a finger may be detected by a suitable electronic circuit, such as the circuit shown in aforementioned U.S. Pat. No. 3,691,555.

It is readily apparent that the disclosed electronic keyboard is not restricted to using touch activated keys with capacitive coupling. As those skilled in the art readily appreciate, any other kind of touch activated keys, such as keys including electrically conductive regions having selected coupling resistance being changeable by touching by a human finger, may be also used for a keyboard of this invention.

Figure 6:
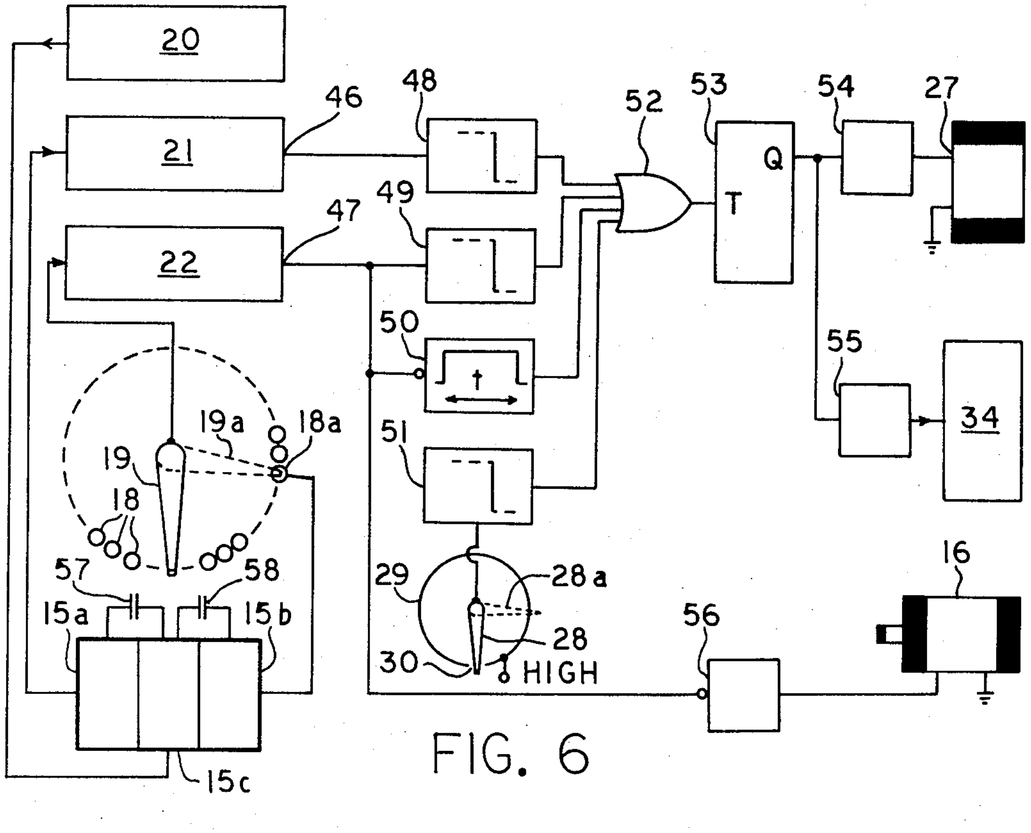
FIG. 6 is a schematic diagram of an exemplary circuit for actuating a typewriter with electronic keyboard of FIG. 1.

In FIG. 6 is shown exemplary schematic diagram of an electronic circuit for actuating a typewriter of FIG. 1. The circuit employs digital integrated circuits, such are OR gate 52 and negative edge-triggered T-type flip-flop 53. Two voltage levels, referred to as high and low, are employed in the circuit.

When no key of the matrix is touched, type wheel 13 and wiper 19 are stationary in home position, flip-flop 53 is reset, and on the outputs 46, 47 of sensing circuits 21, 22, respectively, are high voltage levels.

When any key of the matrix, such as the key illustrated in FIG. 6, is touched by a finger, the coupling capacitance of the conductive areas of the key increases, which is indicated by adding capacitances 57, 58. Increased high frequency current flows from generator 20 via conductive area 15*c*, capacitance 57, conductive area 15*a* to the input of sensing circuit 21. The increase of the current is detected by the sensing circuit 21 and low voltage level is produced on the output 46 thereof. The transition from high to low level on the output 46 is shaped by a shaping circuit 48, which may be a Schmitt trigger, to a negative edge suitable for triggering a flip-flop. The negative edge is gated by OR gate 52 and triggers flip-flop 53 to its opposite state wherein high level is on Q output. Current amplifier 54 is gated ON by high level on its input, to supply current for energizing coil of relay 27, the latter will magnetically attract arm 24 of the member 23, as was described hereinbefore. Amplifier 55 is also gated ON by high level on its input, to engage clutch and brake 34 to start rotating of the shaft 59, carrying type wheel 13 and wiper 19. While rotating, wiper 19 electrically connects contacts 18, one at a time, to the input of sensing circuit 22.

When the contact 18*a* is reached, the increased high frequency current from generator 20 flows via conductive area 15*c*, capacitance 58, conductive area 15*b*, contact 18*a*, wiper 19*a* to the input of sensing circuit 22. The increase of the current, caused by increased capicitance 58, is detected by sensing circuit 22, the low voltage level being produced on the output 47 thereof. Transition from high to low level on output 47 is shaped by a shaping circuit 49, gated by OR gate 52, and triggers flip-flop 53 to its opposite state wherein low level is on Q output. Amplifier 54 is gated OFF by low level on its input, coil of relay 27 does not magnetically attract arm 24 of the member 23, as described hereinbefore. Amplifier 55 is also gated OFF by low level on its input, to disengage clutch and brake 34, to stop rotation of the rotating assembly in a printing position aligned with the touched key of the keyboard.

Amplifier 56 is gated ON by low level on its input, to energize solenoid 16, to move printing hammer 17 forwardly to strike type bar 14*a* in printing position.

Monostable multivibrator 50 is also gated ON by low voltage level on its input, to produce a pluse of width *t*, time *t* being sufficient for stopping the rotating assembly in printing position and for accomplishing the printing operation. When the pulse ends, trailing edge thereof, being gated by OR gate 52, triggers flip-flop 53 again to its opposite state wherein high level is on Q output, to actuate again the driving mechanism to rotate the assembly in the same direction back to home position.

The rotating assembly also includes a conductive ring 29 and conductive rotatable arm 28, movable therealong. Being out of home position, the arm 28*a* electrically connects high voltage level from the ring 29 to input of shaping circuit 51. When the rotating assembly reaches the home position, the arm 28 reaches the recess 30 of the ring 29 and the supply of high level is interrupted. The transition from high to low level is shaped by circuit 51, gated by OR gate 52, and triggers again flip-flop 53 to its opposite state wherein low level is on Q output, to stop rotation of the assembly in the home position.

When the key is still being touched by a finger after the aligned character has been imprinted and the rotating assembly has been returned back to home position, the driving mechanism will not be actuated again, until the finger is momentarily lifted therefrom and the other or the same key is touched again.

While a typewriter with a type wheel rotatable in one direction was disclosed hereinbefore, it is readily apparent that a typewriter with an electronic keyboard of this invention and with a type wheel rotatable in two directions may also be embodied. The direction of rotation of such type wheel will be predetermined for each key of the matrix and for each character aligned therewith, so that travelling distance to a printing position will be the shorter one. It is readily apparent that the type wheel will rotate clockwise to printing positions of all characters aligned with the contacts of the left half of the rotary switch, commencing from the home position and ending at the most distant contact from home position. The type wheel will rotate anti-clockwise to printing positions of all characters aligned with the contacts of the right half of the rotary switch. The type wheel will rotate back to home position in another direction. It is readily apparent that average travelling distance of the type wheel to a printing position and back to home position is 180°, while the type wheel rotatable in only one direction must accomplish rotation of 360° for printing of each character. Obviously, when equal rotating speeds are considered, type wheel rotatable in two directions will print characters faster.

The matrix of keys of a typewriter with a type wheel rotatable in two directions will include two sections of keys in alignment with the two halves of contacts of the rotary switch, the second conductive areas of all keys of each section being connected to contacts of the corresponding half of the rotary switch, respectively.

One electronic sensing circuit must be provided for each section of the keys for detecting manual contacting of a key in the particular section, the first conductive areas of all keys of each section being electrically interconnected and being electrically connected to an input of the corresponding sensing circuit. When any key of one section is touched by a finger, the change of coupling capacitance is detected by the sensing circuit of that section, and the output electrical signal is produced for rotating the type wheel and other rotating assembly in corresponding direction. The direction of rotation for all keys of the section aligned with the contacts of the left half of the rotary switch is clockwise, the direction of rotation for the other section of the keys is anti-clockwise. The direction of rotation back to home position is opposite. The type wheel will be stopped in a printing position by a method described hereinbefore.

It will be readily apparent to a person skilled in the art that the electronic circuit for actuating a typewriter with a type wheel rotatable in two directions would be similar to the circuit disclosed in FIG. 6.

Numerous variations in the construction of a typewriter with electronic keyboard of this invention, within the scope of the appended claims, will occur to those skilled in the art in the light of the foregoing disclosure. The described embodiments are merely illustrative.

What I claim is:

1. An electronic keyboard comprising:

a plurality of electronic keys adapted for being actuated, each said key comprising conductive areas adjacent a surface thereof;

means for establishing a selected electrical coupling among said conductive areas in each said key, said coupling being changeable by actuating of said keys;

a plurality of electrical switches, each said switch comprising a plurality of contacts and a wiper movable therealong, said contacts being electrically connected according to a predetermined system to said conductive areas in said keys;

electronic sensing means for detecting a change of said electrical coupling in said keys caused by actuating of said keys, inputs of said sensing means being electrically connected to said wipers of said switches, respectively; and means to move said wipers, respectively, to gradually electrically connect said keys to inputs of said sensing means, respectively, for locating of actuated keys.

2. An electronic keyboard of claim 1 wherein said switches are rotary switches.

3. An electronic keyboard of claim 1 more characterized by:

said means for moving of said wipers comprising continuously rotating electrical motors and a clutch and a brake means selectively engageable and disengageable to cause said wipers to move and to stop moving, respectively.

4. An electronic keyboard comprising:

a plurality of electronic keys avoiding mechanical motion and adapted for being manually contacted, each said key comprising a first conductive area adjacent a surface thereof and a second conductive area adjacent a surface thereof, said first conductive areas of all said keys being integral;

high frequency generator having its output connected to said integral first conductive areas of said keys for establishing an electrical oscillation in said keys, said oscillation in said keys being changeable by manually contacting of said keys;

rotary switch comprising a plurality of contacts and a wiper movable therealong, said contacts being electrically connected to said second conductive areas of said keys, respectively;

a first electronic sensing means for detecting a change of said oscillation in said keys caused by manually contacting of said keys, input of said first sensing means being electrically connected to said wiper of said rotary switch; and means to move said wiper to gradually electrically connect said second conductive areas of said keys to input of said first sensing means, for locating of manually contacted keys.

5. An electronic keyboard of claim 4 further characterized by:

a third conductive area in each said key adjacent a surface thereof, said third conductive areas of all said keys being integral;

a second electronic sensing means for detecting a change of said oscillation in said keys caused by manually contacting of said keys, input of said second sensing means being electrically connected to said integral third conductive areas, output of said second sensing means being operatively connected to said means for moving of said wiper of said rotary switch, to cause said wiper to move when a change of oscillation in any said key caused by manually contacting of said key is detected by said second sensing means.

6. An electronic keyboard of claim 4 more characterized by:

output of said first sensing means being operatively connected to said means for moving of said wiper of said rotary switch, to cause said wiper to stop moving when a manually contacted key is located by said first sensing means.

* * * * *